US012567778B2

(12) United States Patent　　　(10) Patent No.:　US 12,567,778 B2
Pradeepkumar et al.　　　　　　(45) Date of Patent:　　Mar. 3, 2026

(54) ELECTRIC MOTOR WITH STATOR BOOSTER AND METHODS OF MANUFACTURING AN ELECTRIC MOTOR WITH A STATOR BOOSTER

(71) Applicant: Ford Global Technologies, LLC, Dearborn, MI (US)

(72) Inventors: Akash Changarankumarath Pradeepkumar, Westland, MI (US); Singar Rathnam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 460 days.

(21) Appl. No.: 18/326,574

(22) Filed: May 31, 2023

(65) Prior Publication Data

US 2024/0405626 A1　　Dec. 5, 2024

(51) Int. Cl.
*H02K 3/34*　　　(2006.01)
*H02K 1/16*　　　(2006.01)
*H02K 15/021*　　(2025.01)

(52) U.S. Cl.
CPC ............... *H02K 3/345* (2013.01); *H02K 1/16* (2013.01); *H02K 15/021* (2025.01)

(58) Field of Classification Search
CPC ........... H02K 1/16; H02K 3/34; H02K 3/345; H02K 15/021
USPC ......................................................... 310/179
See application file for complete search history.

(56) References Cited

U.S. PATENT DOCUMENTS

| | | | |
|---|---|---|---|
| 8,203,251 | B2 | 6/2012 | Shizuka et al. |
| 10,855,131 | B2 | 12/2020 | Coldwate et al. |
| 2010/0244617 | A1 | 9/2010 | Nobata et al. |
| 2010/0257722 | A1 * | 10/2010 | Onimaru .............. H02K 15/021 |
| | | | 29/596 |
| 2019/0199156 | A1 * | 6/2019 | Bernreuther ............. H02K 1/16 |
| 2023/0134509 | A1 * | 5/2023 | Leonardi .................. H02K 3/30 |
| | | | 310/179 |
| 2024/0405626 | A1 * | 12/2024 | Pradeepkumar ......... H02K 1/16 |

FOREIGN PATENT DOCUMENTS

WO　　　2018088115　　　5/2018

OTHER PUBLICATIONS

Additive Manufacturing Media, 3D Printing Rotors for Electric Motors, YouTube Video, Jan. 4, 2022.

* cited by examiner

*Primary Examiner* — Rashad H Johnson
(74) *Attorney, Agent, or Firm* — Burris Law, PLLC

(57)　　　　　　ABSTRACT

A motor includes a stator core and a stator booster. The stator booster includes a booster back-iron and a plurality of booster teeth. The booster back-iron includes a first end surface that abuts a first end surface of the stator core's back-iron for electrical communication therewith. The booster teeth extend radially inward from the booster back-iron and are spaced apart from one another in a circumferential direction about the central axis to define a plurality of booster slots that align with slots of the stator core. A first end surface of each booster tooth abuts a first end surface of a corresponding tooth of the stator core for electrical communication therewith. An electrically insulating material encapsulates opposite sides of each booster tooth that define the booster slots and a second end surface of each booster tooth that is opposite the first end surface of that booster tooth.

20 Claims, 6 Drawing Sheets

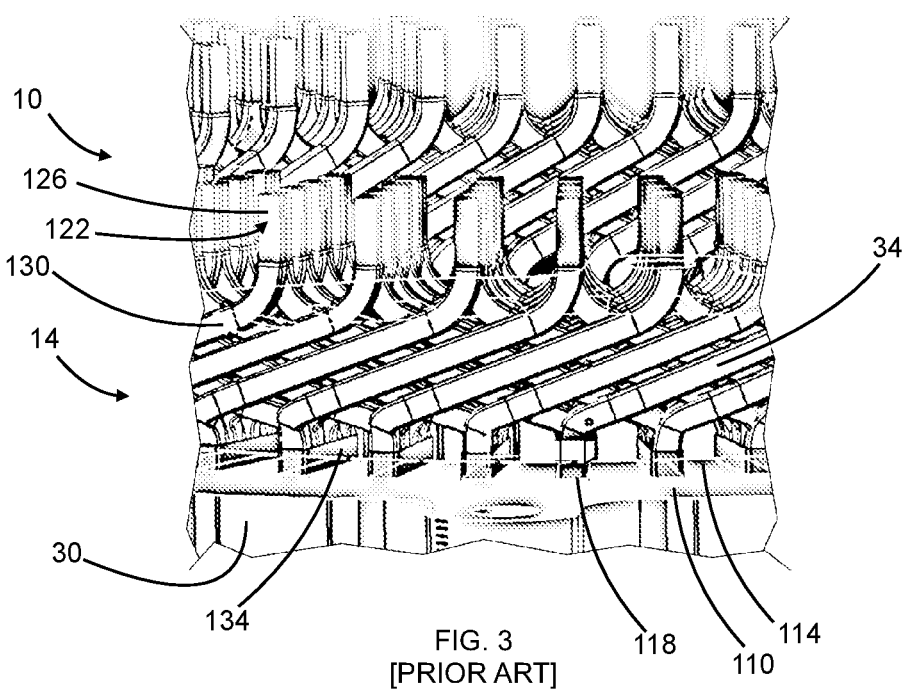
FIG. 3
[PRIOR ART]
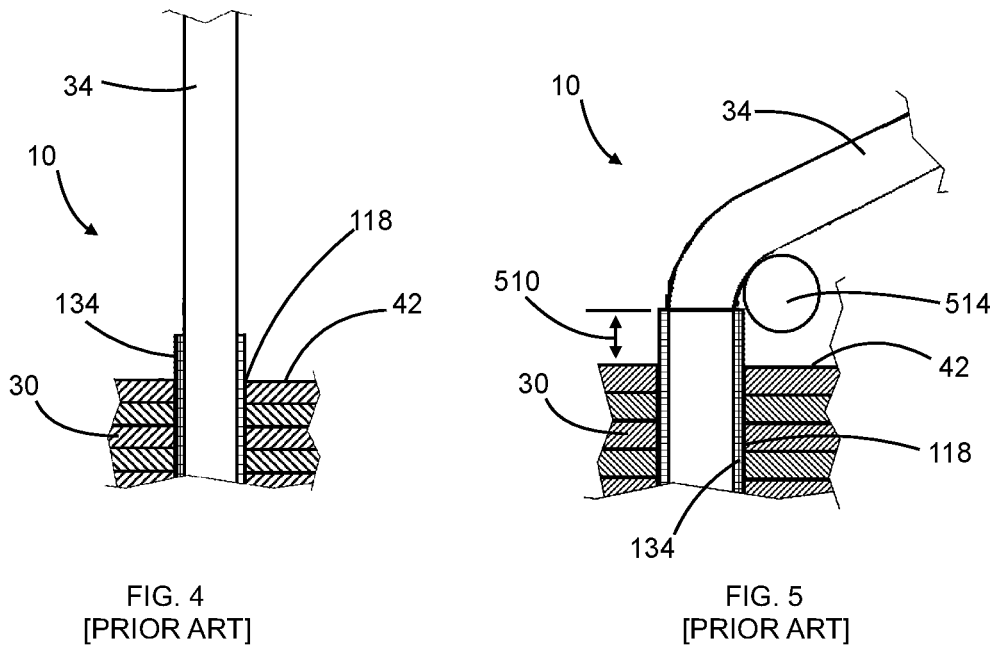
FIG. 4
[PRIOR ART]
FIG. 5
[PRIOR ART]

ELECTRIC MOTOR WITH STATOR BOOSTER AND METHODS OF MANUFACTURING AN ELECTRIC MOTOR WITH A STATOR BOOSTER

FIELD

The present disclosure relates to an electric motor and methods of manufacturing an electric motor that boosts the performance of the stator.

BACKGROUND

The statements in this section merely provide background information related to the present disclosure and may not constitute prior art.

The stator of a typical electric motor includes a stator core and a plurality of stator wires extending axially through channels or slots in the stator core. The stator wires must be electrically insulated from the stator core. Typical electric motors and manufacturing methods for electric motors require the stator wires to extend, in a straight line parallel to the central axis of the motor, a certain distance from the end of the stator core before bending in order to maintain the integrity of the insulating materials that electrically insulate the wires from the stator core.

In applications such as traction motors of electric vehicles, packaging space is limited. As such, this straight length extension of the stator wires from the stator core can limit the total length of the stator core, which can reduce performance (e.g., power) of the motor.

The teachings of the present disclosure address these and other issues with typical electric motors and their manufacturing methods.

SUMMARY

This section provides a general summary of the disclosure and is not a comprehensive disclosure of its full scope or all of its features.

In one form, the present disclosure provides for an electric motor assembly includes a stator core and a stator booster. The stator core includes a core back-iron disposed about a central axis and a plurality of core teeth that extend radially inward from the core back-iron and are spaced apart from one another in a circumferential direction about the central axis to define a plurality of core slots. The stator booster includes a booster back-iron and a plurality of booster teeth. The booster back-iron is disposed about the central axis and includes a first end surface that abuts a first end surface of the core back-iron for electrical communication therewith. The booster teeth extend radially inward from the booster back-iron and are spaced apart from one another in the circumferential direction about the central axis to define a plurality of booster slots that align with the core slots. A first end surface of each booster tooth abuts a first end surface of a corresponding core tooth for electrical communication therewith. A first electrically insulating material encapsulates opposite sides of each booster tooth that define the booster slots and a second end surface of each booster tooth that is opposite the first end surface of that booster tooth.

In variations of the electric motor assembly of the above paragraph, which can be implemented individually or in any combination: the first electrically insulating material encapsulates the booster back-iron against the stator core; the first electrically insulating material is a coating that covers an entirety of the stator booster except the first end surface of the booster back-iron and the first end surface of each booster tooth; the first electrically insulating material does not extend axially into the core slots; each booster tooth is narrower in the circumferential direction than each core tooth; the booster back-iron and the booster teeth are defined by a plurality of laminations stacked in an axial direction with regard to the central axis; the stator core is defined by a plurality of laminations stacked in an axial direction with regard to the central axis; the stator booster is defined by a plurality of arcuate pieces, each arcuate piece including a portion of the booster back-iron and a subset of the plurality of booster teeth, the portions of the booster back-iron being coupled together for electrical communication therebetween in the circumferential direction; the electric motor assembly further includes a first stator wire including a first straight portion extending axially through a first core slot of the core slots and into a first booster slot of the booster slots; the first stator wire includes a first bend joining the first straight portion to a second straight portion, the second straight portion being exterior of the stator core and the stator booster; the first bend begins within the booster slot and ends exterior of the stator booster; the first stator wire is encapsulated in an electrically insulating jacket or sheath along the first straight portion and the first bend; the electric motor assembly further includes a first electrically insulating liner extending axially through the first core slot between the first stator wire and the stator core; the first electrically insulating liner extends axially from the first core slot into the first booster slot and terminating within the first booster slot between the first stator wire and the first electrically insulating material; the electric motor assembly further includes thermally conductive varnish disposed within the first core slot between the stator core and the first stator wire and within the first booster slot between the first stator wire and the stator booster.

In another form, the present disclosure provides for an electric motor assembly includes a stator core and a stator booster. The stator core includes a core back-iron disposed about a central axis and a plurality of core teeth that extend radially inward from the core back-iron and are spaced apart from one another in a circumferential direction about the central axis to define a plurality of core slots. The stator booster includes a booster back-iron and a plurality of booster teeth. The booster back-iron is disposed about the central axis and includes a first end surface that abuts a first end surface of the core back-iron for electrical communication therewith. The booster teeth extend radially inward from the booster back-iron and are spaced apart from one another in the circumferential direction about the central axis to define a plurality of booster slots that align with the core slots. A first end surface of each booster tooth abuts a first end surface of a corresponding core tooth for electrical communication therewith. Each booster tooth is narrower in the circumferential direction than each core tooth. A first electrically insulating material encapsulates opposite sides of each booster tooth that define the booster slots and a second end surface of each booster tooth that is opposite the first end surface of that booster tooth.

In a variation of the electric motor assembly of the above paragraph, the electric motor assembly can further include a first stator wire including a first straight portion extending axially through a first core slot of the core slots and into a first booster slot of the booster slots, wherein the first stator wire includes a first bend joining the first straight portion to a second straight portion, the first bend beginning within the booster slot and ending exterior of the stator booster such that the second straight portion is exterior of the stator core and the stator booster.

In yet a further form, the present disclosure provides for a method of assembling an electric motor assembly including a stator core that includes a core back-iron disposed about a central axis and a plurality of core teeth that extend radially inward from the core back-iron and are spaced apart from one another in a circumferential direction about the central axis to define a plurality of core slots. The method includes attaching a stator booster to the stator core. A booster back-iron of the stator booster is disposed about the central axis and a first end surface of the booster back-iron abuts a first end surface of the core back-iron for electrical communication therewith. Booster teeth, which extend radially inward from the booster back-iron and are spaced apart from one another in the circumferential direction about the central axis to define a plurality of booster slots that align with the core slots, each have a first end surface abutting a first end surface of a corresponding core tooth for electrical communication therewith. A first electrically insulating material encapsulates opposite sides of each booster tooth that define the booster slots and a second end surface of each booster that is opposite the first end surface of that booster tooth.

In variations of the method of the above paragraph, which can be implemented individually or in any combination: the method further includes bending a plurality of stator wires over the booster teeth such that the stator wires contact the booster teeth during the bending; the method further includes routing a plurality of stator wires axially through the core slots, wherein the stator booster is attached to the stator core after routing the plurality of stator wires axially through the core slots.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a perspective view of a portion of the electric motor of FIG. 1;

FIG. 4 is a cross-sectional view of a portion of the electric motor of FIG. 1 during a typical assembly step;

FIG. 5 is a cross-sectional view of a portion of the electric motor of FIG. 2 during another typical assembly step;

Figure 1:
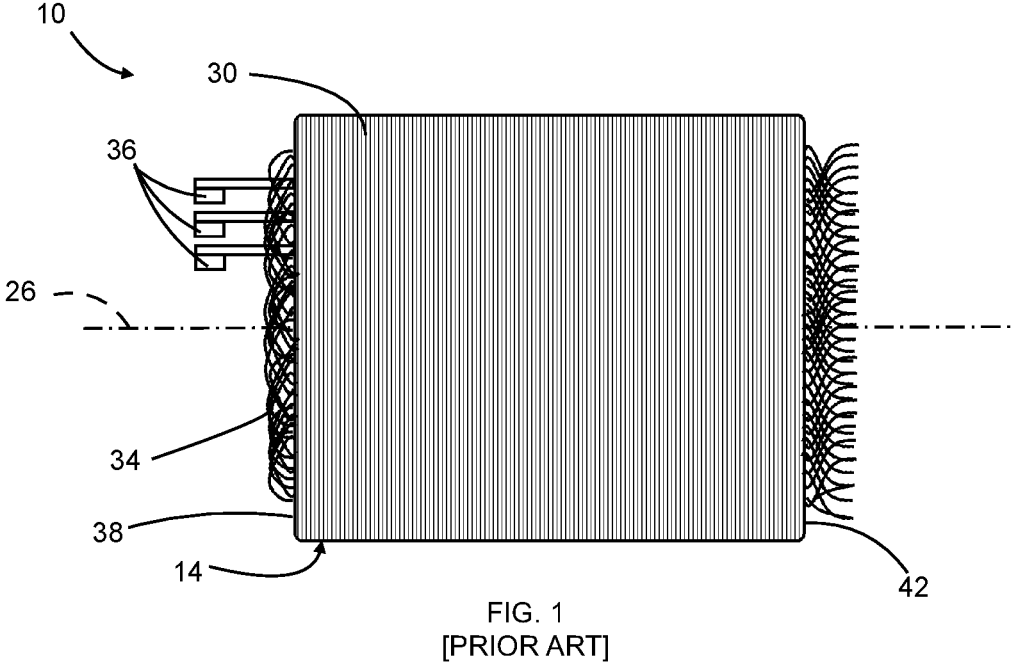
FIG. 1 is a schematic side view of a typical electric motor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
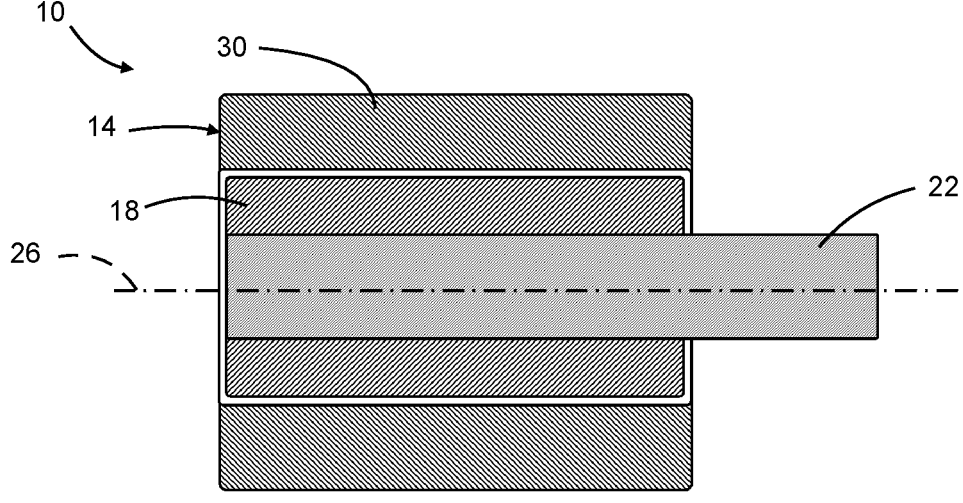
FIG. 2 is a schematic cross-sectional view of the electric motor of FIG. 1.

Referring to FIGS. 1 and 2, a typical electric motor 10 is illustrated. The motor 10 includes a stator 14, a rotor 18, and an output shaft 22. The output shaft 22 is coupled to the rotor 18 for common rotation about a central axis 26. The stator 14 is disposed coaxially about the rotor 18. The rotor 18 is configured to rotate relative to the stator 14. The stator 14 includes a stator core 30 and a plurality of stator wires 34 (not shown in FIG. 2 for ease of illustration) and a plurality of electrical leads or terminals 36.

The stator core 30 can be solid or may be formed by a plurality of axially stacked laminations (schematically illustrated by vertical lines in FIG. 1; not specifically shown in FIG. 2 for ease of illustration). The stator wires 34 extend axially through the stator core 30 and extend axially from both ends (i.e., a first end 38 and a second end 42) of the stator core 30. At the first end 38, the stator wires 34 extend axially therefrom and then bend and/or twist back into the stator core 30, where they extend axially back through the stator core 30. The first end 38 is also referred to as the twist end.

With additional reference to FIG. 3, the stator core 30 includes a core back-iron 110 and a plurality of core teeth 114. The core back-iron 110 and core teeth 114 are formed of a material that will produce a magnetic field when electricity flows through the stator wires 34, i.e., a ferromagnetic material such as steel or iron for example. The core back-iron 110 extends in the circumferential direction about the axis 26 to define a complete annular shape about the axis 26. The core teeth 114 extend radially inward from the core back-iron 110 such that the core teeth 114 are in electrical communication with the core back-iron 110. The core teeth 114 are spaced apart in the circumferential direction about the axis 26 to define a plurality of slots 118 that extend axially (i.e., parallel to the axis 26) through the stator core 30 and are open through the first and second ends 38, 42. In the example provided, the slots 118 are also open in the radial direction toward the axis 26. As such, the slots 118 are spaced apart in the circumferential direction about the axis 26. The stator wires 34 extend axially through the slots 118. A plurality of the stator wires 34 are disposed in each slot 118. In the example provided, the stator wires 34 are arranged in a single, radially extending row of stator wires 34 in each slot 118. In other words, adjacent wires within a particular slot 118 are either radially inward or radially outward of each other. As such, no two stator wires 34 in the same slot 118 are adjacent in the circumferential direction.

At the second end 42, the stator wires 34 extend axially from the second end 42 of the stator core 30 in a straight line, parallel to the axis 26, a predetermined distance 510 (labeled in FIG. 5) before bending generally in one of the circumferential directions about the axis 26 before bending again in a direction parallel to the axis 26 and away from the second end 42. An end portion 122 of each stator wire 34 is electrically coupled to an end portion 122 of one different stator wire 34, such as by welding or soldering for example. The second end 42 is also referred to as the crown end.

At the first end 38, the stator wires 34 also extend axially from the first end 38 of the stator core 30 in a straight line, parallel to the axis 26, a predetermined distance (similar to distance 510, labeled in FIG. 5) before bending back toward the first end 38 and then extend axially again toward the first end 38 of the stator core 30 in a straight line, parallel to the axis 26, a predetermined distance (similar to distance 510, labeled in FIG. 5) before entering a different slot 118. The first end 38 is also referred to as the twist end.

Each stator wire 34 includes an electrical conductor 126 that is insulated from the stator core 30 and from the other stator wires 34, except at the connected end portions 122, though the connected end portions 122 may be subsequently insulated after connection. In the example shown, each electrical conductor 126 is sheathed in an electrically insulating sheath 130 that extends the length of the conductor 126 except for the connected end portions 122.

In the example provided, an electrically insulating sleeve 134 may also optionally extend axially through the slots 118 to provide additional insulation between the stator core 30 and the sheath 130. In the example shown, each slot 118 has a single sleeve 134 such that all of the stator wires 34 in that slot 118 are within the same sleeve 134, though other configurations may be used, such as each stator wire 34 being surrounded by a corresponding sleeve 134 or the stator wires 34 in each slot 118 being divided into groups with each group surrounded by a corresponding sleeve 134, for example. The sleeve 134 extends axially the full length of the slot 118. The sleeve 134 extends axially outward from the slot 118 from the first and second ends 38, 42, to extend at least partially along the straight portions (e.g., at least partially along the distance 510, labeled in FIG. 5) of the stator wire 34 before the bends. In some forms, the sleeve 134 is formed of a paper material, though other electrically insulating materials can be used.

The terminals 36 are coupled to the electrical wires 34 to provide electrical power thereto. In the example provided, the electric motor is a three-phase alternating current (AC) electric motor such that each terminal 36 provides one of the phases to a corresponding set of the wires 34, but other configurations may be used such as single phase AC or direct current (DC) for example.

With additional reference to FIGS. 4 and 5, the typical electric motor 10 is constructed by forming the stator core 30, such as by connecting the laminations end-on-end so that they are in electrical communication with each other. The sleeves 134 may then be inserted through the slots 118 if they are used. The stator wires 34 are then threaded through the slots 118. In one form, each stator wire 34 may be threaded from the second end 42, through one of the slots 118, out the first end 38, bent back, and then threaded back into the first end 38 into a different slot 118 and threaded back through that slot 118 so that both end portions 122 (FIG. 3) of the stator wire 34 extend from the second end 42. Alternatively, each stator wire 34 may be pre-bent and both end portions 122 (FIG. 3) can be threaded through different slots 118 from the first end 38 (FIG. 1) until both end portions 122 (FIG. 3) extend from the second end 42.

At this step, the wire 34 extends from the second end 42 from the slots 118 in a generally straight line, i.e., parallel to the axis 26 (FIGS. 1 and 2), as shown in FIG. 4. It is understood that the wire 34 may not be perfectly straight or perfectly parallel to the axis 26 (FIGS. 1 and 2) but merely does not have the desired bends on this end at this step.

A tool 514 (FIG. 5), such as a mandrel, having a curved surface or an edge is positioned next to the wire 34 to provide a surface around which to bend the wire 34. The tool 514 is a predetermined distance from the second end 42 so that the predetermined distance 510 of straight length will be achieved. In the example provided, the mandrel a circular shape to provide a bend radius, though other shapes can be used including irregular curves for example. In the example provided, the tool 514 is positioned such that the bend begins at or after the end of the sleeve 134 to resist ripping the sleeve 134. Subsequent bends can then be done and the end portions 122 (FIG. 3) of different stator wires 34 can be joined as described above.

Figure 6:
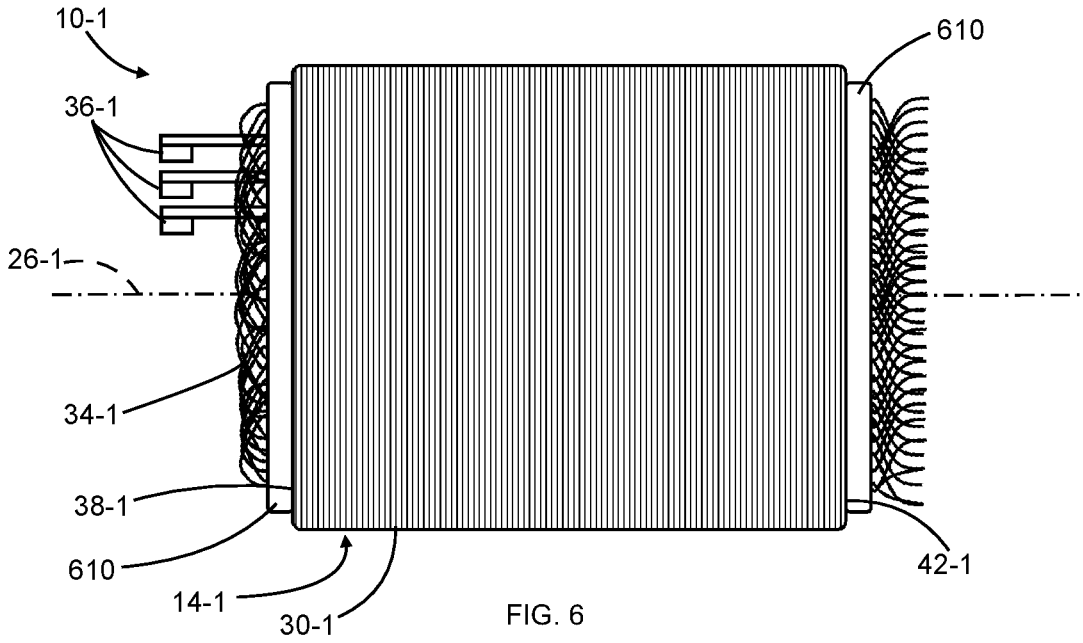
FIG. 6 is a schematic side view of an electric motor according to the teachings of the present disclosure, illustrating a stator core, a plurality of stator windings, and a stator booster of the electric motor.

Referring to FIG. 6, an electric motor 10-1 according to the present disclosure is schematically illustrated. The motor 10-1 can be similar to the motor 10 (FIGS. 1-5) except as otherwise described herein and can be constructed in a similar manner except as otherwise described herein. Accordingly, similar features are denoted with the same reference numerals but followed by "−1" and only differences will be described in detail.

The stator 14-1 of the motor 10-1 includes a stator core 30-1, a plurality of stator wires 34-1, and at least one stator booster 610 (also referred to herein simply as the booster 610). In the example shown in FIG. 6, corresponding stator boosters 610 are attached to the first and second ends 38-1, 42-1. In another form, not specifically shown, only the first end 38-1 includes a stator booster 610 attached thereto. In yet another form, not specifically shown, only the second end 42-1 includes a stator booster 610 attached thereto.

Figure 7:
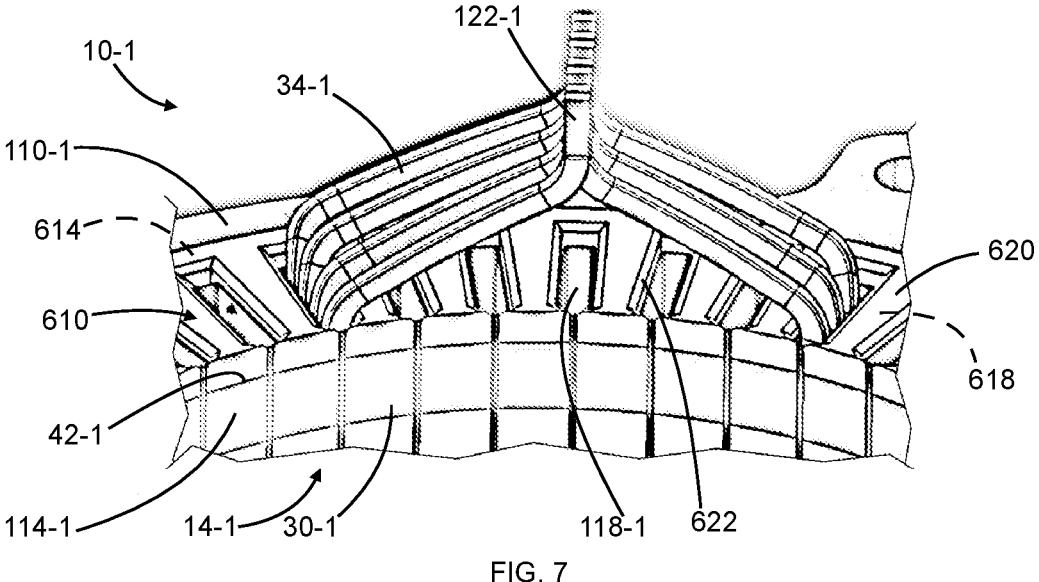
FIG. 7 is a perspective view of a portion of the electric motor of FIG. 6.

Referring to FIG. 7, a portion of the stator 14-1 is illustrated including part of the second end 42-1 of the stator core 30-1 and part of the stator booster 610. The stator booster 610 disposed on the first end 38-1 (FIG. 6) is similar to the stator booster 610 disposed on the second end 42-1. As such, only one of the stator boosters 610 is described herein in detail.

In FIG. 7, only a few of the stator wires 34-1 are illustrated in a couple of the slots 118-1 for ease of illustration but it should be understood that the stator 14-1 includes additional stator wires 34-1, arranged similarly to those shown in FIGS. 3 and 6, in the remaining slots 118-1. Similar to the motor 10 (FIGS. 1-5), the motor 10-1 is a three-phase AC electric motor, but other types may be used such as single phase AC, or DC for example.

The booster 610 includes a booster back-iron 614, a plurality of booster teeth 618, and insulating material 620. The booster back-iron 614 and booster teeth 618 are formed of a material that will produce a magnetic field when electricity flows through the stator wires 34-1, i.e., a ferromagnetic material such as steel or iron for example.

The booster back-iron 614 extends in the circumferential direction about the axis 26-1 to define a complete annular shape about the axis 26-1. As such, the booster back-iron 614 is coaxial with the core back-iron 110-1. The booster back-iron 614 contacts the core back-iron 110-1 such that it is in electrical communication therewith. In the example shown, the thickness in the radial direction of the booster back-iron 614 is less than that of the core back-iron 110-1. In an alternative form, not specifically shown, the radial thicknesses can be equal. In the example provided, the outer diameter of the booster back-iron 614 is less than the outer diameter of the core back-iron 110-1. In an alternative form, the outer diameters can be equal. In the example provided, the inner diameter of the booster back-iron 614 is greater than the inner diameter of the core back-iron 110-1. In an alternative form, the inner diameters can be equal.

The booster teeth 618 extend radially inward from the booster back-iron 614 such that the booster teeth 618 and booster back-iron 614 are in electrical communication. The booster teeth 618 are spaced apart in the circumferential direction about the axis 26-1 (FIG. 6) to define a plurality of booster slots 622 that extend axially (i.e., parallel to the axis 26-1) through the booster 610. As such, the booster slots 622 are spaced apart in the circumferential direction about the axis 26-1 (FIG. 6). In the example provided, the booster slots 622 are also open in the radial direction toward the axis 26-1. The number of booster teeth 618 is equal to the number of core teeth 114-1 and each booster tooth 618 aligns with a corresponding core tooth 114-1 such that the booster slots 622 align with and are open to the slots 118-1 of the stator core 30-1. As such, the stator wires 34-1 extend axially through the booster slots 622. The booster teeth 618 contact their corresponding core tooth 114-1 for electrical communication therebetween.

In one form, the booster back-iron 614 and the booster teeth 618 are the same material as the stator core 30-1. In another form the booster back-iron 614 and the booster teeth 618 can be a different material.

Figures 8, 9, 10:
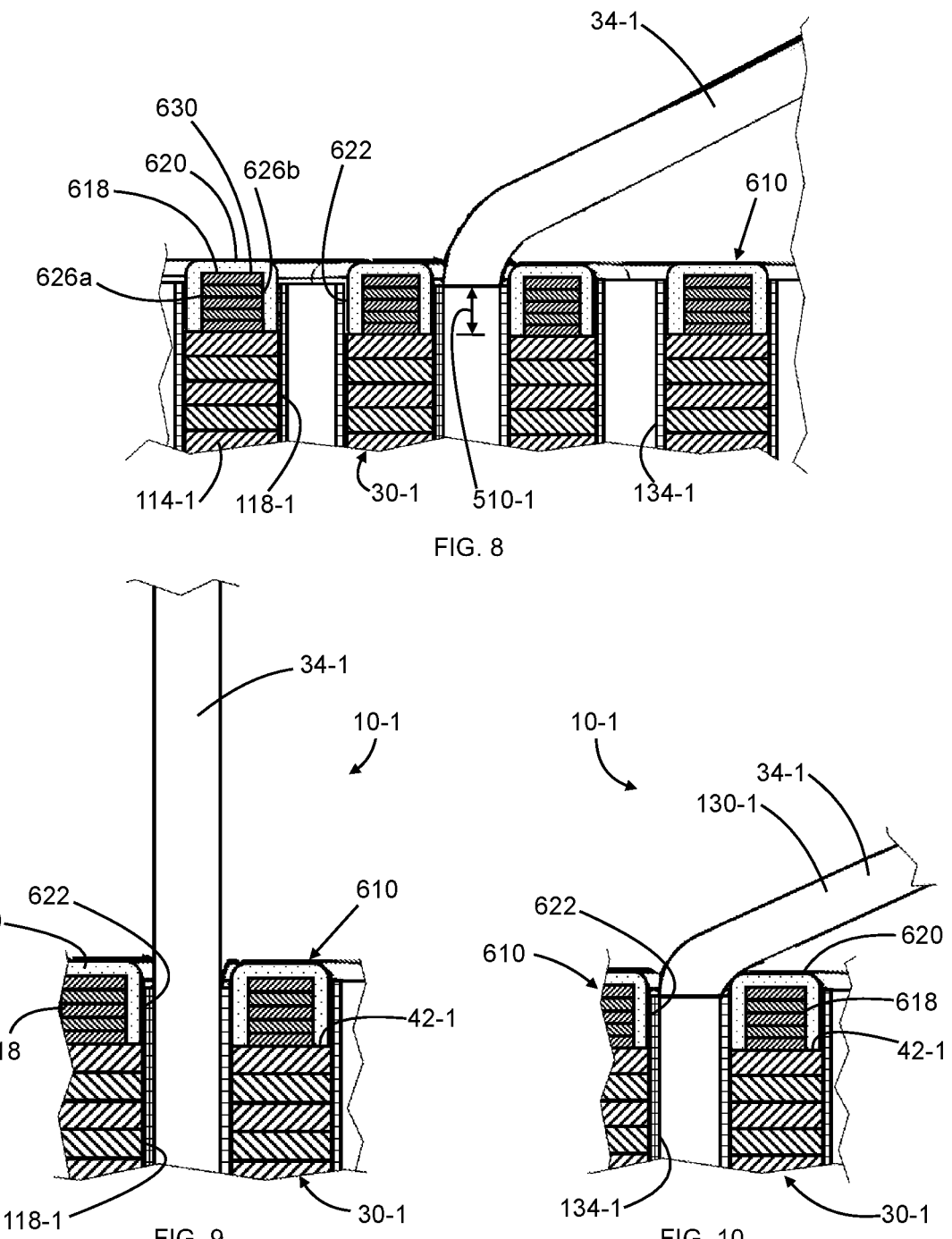
FIG. 8 is a cross-sectional view of a portion of the electric motor of FIG. 6.
FIG. 9 is a cross-sectional view of a portion of the electric motor of FIG. 6, illustrated during an assembly step according to the present disclosure.
FIG. 10 is a cross-sectional view similar to FIG. 9, illustrating the portion of the electric motor during a second assembly step according to the present disclosure.

Referring to FIG. 8, the booster teeth 618 can be thinner in the circumferential direction than the core teeth 114-1. In one form, the core teeth 114-1 extend radially inward of the booster teeth 618. In other words, an innermost diameter defined by the tips of the booster teeth 618 may be greater than an innermost diameter defined by the tips of the core teeth 114-1. In another form, the innermost diameters defined by the tips of the core teeth 114-1 and the booster teeth 618 can be equal.

The insulating material 620 is electrically insulating, such as polymer or rubber for example. The insulating material 620 can be a coating that covers at least the portion of each booster tooth 618 that is aligned with the stator wires 34-1. As such, the insulating material 620 covers opposite sides 626*a*, 626*b* and the axial end 630 of each booster tooth 618. In the example provided, the entirety of each booster tooth 618 is covered by the insulating material 620 except the surface contacting the core teeth 114-1. The insulating material 620 does not extend into the slots 118-1. In the example provided, the insulating material 620 may also cover the booster back-iron 614 (FIG. 7) except for the surface contacting the core back-iron 110-1 (FIG. 7). In an alternative form, not specifically shown, the booster back-iron 614 may be uncoated by the insulating material 620.

In the example provided, the thickness of each booster tooth 618 is less than the thickness of each core tooth 114-1 by a dimension approximately equal to or greater than the thickness of the insulating material 620. In other words, the total thickness of the booster tooth 618 with the insulating material 620 can be equal to or less than the thickness of the core tooth 114-1. As such, the booster slots 622 have a thickness in the circumferential direction equal to or greater than that of the slots 118-1.

The booster teeth 618 extend axially from the stator core 30-1 a distance that is greater than the predetermined distance 510-1 in which the stator wires 34-1 extend in a straight line from the stator core 30-1. As such the stator wires 34-1 begin to bend while still within the booster slots 622 and complete their bends exterior of the booster slots 622. In the example provided, the sleeves 134-1 are optionally included and may extend into the booster slots 622 and may terminate therein.

While not specifically shown, the rotor of the motor 10-1 may extend axially beyond the stator core 30-1 to overlap in the axial direction with the booster(s) 610.

Referring to FIGS. 9 and 10, one form of manufacturing the motor 10-1 can include attaching the booster 610 to one or more ends 38-1 (FIG. 6), 42-1 of the stator core 30-1 before threading the stator wires 34-1 through the slots 118-1 and the booster slots 622. Similar to the method described above for the motor 10 (FIGS. 1-5), in one form, each stator wire 34-1 may be threaded from the second end 42-1, through one of the slots 118-1 and the booster slot 622 located on the second end 42-1, out the first end 38-1 (and out the booster slot 622 of a booster 610 on the first end 38-1 (FIG. 6) if included thereon), bent back, and then threaded back into the first end 38-1 into a different slot 118-1 (and its corresponding booster slot 622 if applicable) and threaded back through the stator core 30-1 and the booster 610 so that both end portions 122-1 (FIG. 7) of the stator wire 34-1 extend from the booster 610 on the second end 42-1.

Alternatively, each stator wire 34-1 may be pre-bent and both end portions 122-1 (FIG. 7) can be threaded through different slots 118-1 from the first end 38-1 (FIG. 6; and slots 622 on the booster 610 on the first end 38-1 if applicable) until both end portions 122-1 (FIG. 7) extend from the second end 42-1 and through the booster 610 thereon.

At this step, the stator wire 34-1 extends from the second end 42-1 from the slots 118-1 and the corresponding slots 622 in a generally straight line, i.e., parallel to the axis 26-1 (FIG. 6), as shown in FIG. 9. It is understood that the wire 34-1 may not be perfectly straight or perfectly parallel to the axis 26-1 but merely does not have the desired bends on this end at this step.

As shown in FIG. 10, the insulated booster teeth 618 can replace the need for the tool 514 (FIG. 5) by providing an electrically insulated surface around which to bend the wire 34-1. The electrically insulating material 620 can make the sheath 130-1 optional if the sleeve 134-1 is included. The electrically insulating material 620 can also cushion contact between the tooth 618 and the wire 34-1 to resist abrasion of the sheath 130-1. The top edge of the booster teeth 618 and insulating material 620 may optionally have a rounded shape to provide a desired bend radius. If a booster 610 is included on the first end 38-1 (FIG. 6), that booster 610 may also be used in place of a tool for bending the stator wire 34-1 back toward the stator core 30-1 on that end in a similar manner.

In the example provided, the booster back-iron 614 (FIG. 7) and booster teeth 618 may be formed by coupling a plurality of laminations (shown in FIGS. 8-10) end-on-end, though other configurations can be used, such as additive manufacturing, casting, forging, or milling from a single piece.

Returning to FIG. 7, the booster back-iron 614 and the booster teeth 618 can be coupled to the core back-iron 110-1 and core teeth 114-1 by any suitable method including adhesive, welding, or fasteners for example.

Figure 11:
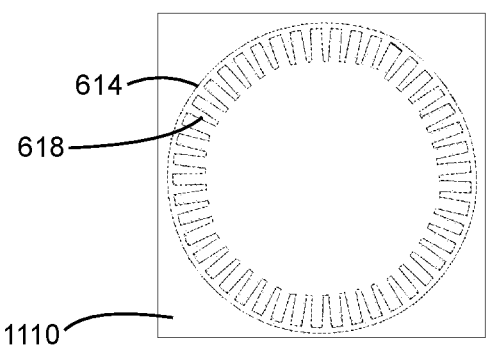
FIG. 11 is a top view of a portion of the stator booster of FIG. 6 during an assembly step according to the present disclosure.

Referring to FIG. 11, the entire annular shape defined by the booster back-iron 614 and the teeth 618, whether it be each lamination of a laminated construction or a single-piece construction, may be cut out of a piece of bulk material 1110, such as a sheet of metal for example.

Figure 12:
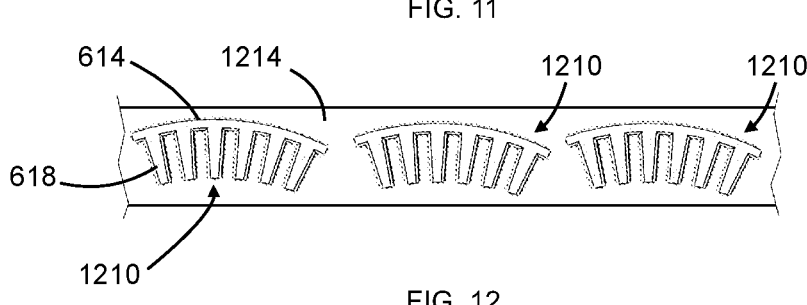
FIG. 12 is a top view of a portion of the stator booster of FIG. 6 during an assembly step of a second form according to the present disclosure.

Referring to FIG. 12, the entire annular shape defined by the back-iron 614 and the teeth 618, whether it be each lamination of a laminated construction or a solid construction, may be formed as arc-length segments 1210, whose portions of the booster back-iron 614 are then joined together to form the complete annular shape. This construction method has the benefit of reducing scrap from bulk material 1214 from which the segments 1210 are cut if cut from sheet material or reducing the size and complexity of the tooling needed if formed from milling, casting, forging, or other methods.

Figure 13:
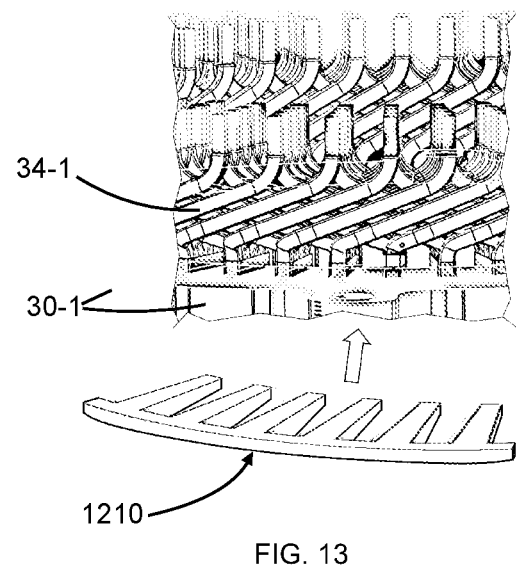
FIG. 13 is a perspective view of a portion of the electric motor of FIG. 6, illustrated during another assembly step according to the present disclosure.

As shown in FIG. 13, the segments 1210 also may be installed on the stator core 30-1 after the stator wires 34-1 are bent by sliding the segments 1210 radially inward under the bent wires 34-1. The segments 1210 may also be used to retrofit existing motors to boost performance thereof. When retrofitting an existing motor, the axial length of the rotor may also optionally be extended to correspond with the added length of the stator.

The insulating material 620 can be applied to the booster teeth 618 and the booster back-iron 614 before or after attachment to the stator core 30-1, whether using the full annular construction of FIG. 11 or the segments 1210 of FIG. 12. In one form, the insulating material 620 may be dip-coated. In another form, the insulating material 620 may be overmolded onto the booster back-iron 614 and teeth 618. In another form the insulating material 620 may be sprayed on or brushed on. In yet another form, the insulating material 620 may be added in layers by additive manufacturing.

Figure 14:
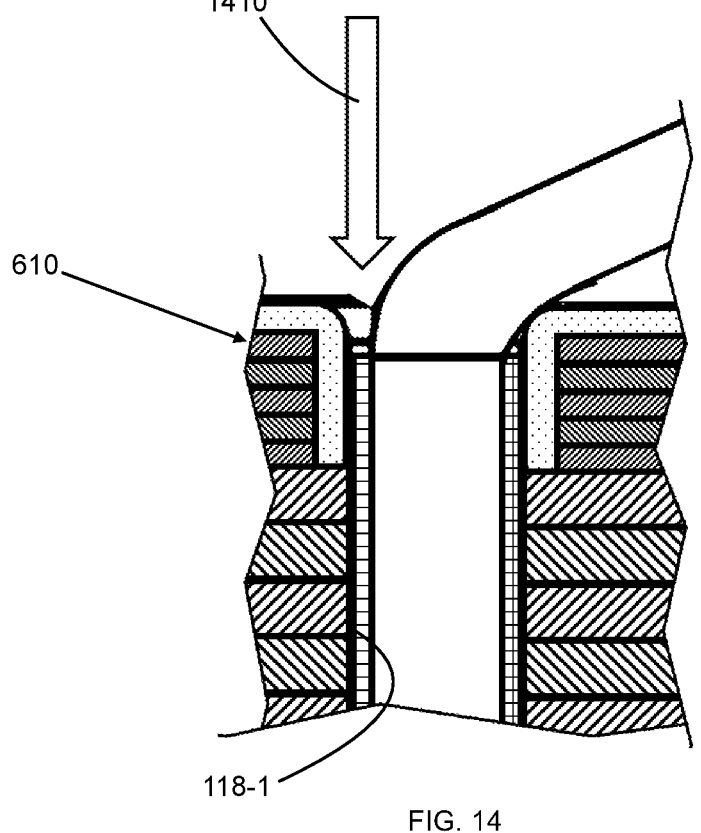
FIG. 14 is a cross-sectional view of the electric motor of FIG. 6, illustrated during another assembly step according to the present disclosure.

Referring to FIG. 14, an additional benefit of the booster 610 is that it also can act as a dam or funnel when pouring varnish (indicated by arrow 1410) into the slots 118-1.

Accordingly, the teachings of the present disclosure provide for an electric motor with increased power without increasing the use of copper wires and without increasing the total size of the motor.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric motor assembly comprising:
   a stator core including a core back-iron disposed about a central axis and a plurality of core teeth that extend radially inward from the core back-iron and are spaced apart from one another in a circumferential direction about the central axis to define a plurality of core slots; and a stator booster including a booster back-iron and a plurality of booster teeth, the booster back-iron being disposed about the central axis and including a first end surface that abuts a first end surface of the core back-iron for electrical communication therewith, the booster teeth extending radially inward from the booster back-iron and being spaced apart from one another in the circumferential direction about the central axis to define a plurality of booster slots that align with the core slots, a first end surface of each booster tooth abutting a first end surface of a corresponding core tooth for electrical communication therewith,
   wherein a first electrically insulating material encapsulates opposite sides of each booster tooth that define the booster slots and a second end surface of each booster tooth that is opposite the first end surface of that booster tooth.

2. The electric motor assembly according to claim 1, wherein the first electrically insulating material encapsulates the booster back-iron against the stator core.

3. The electric motor assembly according to claim 1, wherein the first electrically insulating material is a coating that covers an entirety of the stator booster except the first end surface of the booster back-iron and the first end surface of each booster tooth.

4. The electric motor assembly according to claim 1, wherein the first electrically insulating material does not extend axially into the core slots.

5. The electric motor assembly according to claim 1, wherein each booster tooth is narrower in the circumferential direction than each core tooth.

6. The electric motor assembly according to claim 1, wherein the booster back-iron and the booster teeth are defined by a plurality of laminations stacked in an axial direction with regard to the central axis.

7. The electric motor assembly according to claim 1, wherein the stator core is defined by a plurality of laminations stacked in an axial direction with regard to the central axis.

8. The electric motor assembly according to claim 1, wherein the stator booster is defined by a plurality of arcuate pieces, each arcuate piece including a portion of the booster back-iron and a subset of the plurality of booster teeth, the portions of the booster back-iron being coupled together for electrical communication therebetween in the circumferential direction.

9. The electric motor assembly according to claim 1, further comprising:
   a first stator wire including a first straight portion extending axially through a first core slot of the core slots and into a first booster slot of the booster slots.

10. The electric motor assembly according to claim 9, wherein the first stator wire includes a first bend joining the first straight portion to a second straight portion, the second straight portion being exterior of the stator core and the stator booster.

11. The electric motor assembly according to claim 10, wherein the first bend begins within the booster slot and ends exterior of the stator booster.

12. The electric motor assembly according to claim 10, wherein the first stator wire is encapsulated in an electrically insulating sheath along the first straight portion and the first bend.

13. The electric motor assembly according to claim 12, further comprising a first electrically insulating liner extending axially through the first core slot between the first stator wire and the stator core.

14. The electric motor assembly according to claim 13, wherein the first electrically insulating liner extends axially from the first core slot into the first booster slot and terminating within the first booster slot between the first stator wire and the first electrically insulating material.

15. The electric motor assembly according to claim 9, further comprising thermally conductive varnish disposed within the first core slot between the stator core and the first stator wire and within the first booster slot between the first stator wire and the stator booster.

16. An electric motor assembly comprising:

a stator core including a core back-iron disposed about a central axis and a plurality of core teeth that extend radially inward from the core back-iron and are spaced apart from one another in a circumferential direction about the central axis to define a plurality of core slots; and a stator booster including a booster back-iron and a plurality of booster teeth, the booster back-iron being disposed about the central axis and including a first end surface that abuts a first end surface of the core back-iron for electrical communication therewith, the booster teeth extending radially inward from the booster back-iron and being spaced apart from one another in the circumferential direction about the central axis to define a plurality of booster slots that align with the core slots, a first end surface of each booster tooth abutting a first end surface of a corresponding core tooth for electrical communication therewith, wherein each booster tooth is narrower in the circumferential direction than each core tooth, wherein a first electrically insulating material encapsulates opposite sides of each booster tooth that define the booster slots and a second end surface of each booster tooth that is opposite the first end surface of that booster tooth.

17. The electric motor assembly according to claim 16, further comprising a first stator wire including a first straight portion extending axially through a first core slot of the core slots and into a first booster slot of the booster slots, wherein the first stator wire includes a first bend joining the first straight portion to a second straight portion, the first bend beginning within the booster slot and ending exterior of the stator booster such that the second straight portion is exterior of the stator core and the stator booster.

18. A method of assembling an electric motor assembly including a stator core that includes a core back-iron disposed about a central axis and a plurality of core teeth that extend radially inward from the core back-iron and are spaced apart from one another in a circumferential direction about the central axis to define a plurality of core slots, the method comprising:

attaching a stator booster to the stator core such that a booster back-iron of the stator booster is disposed about the central axis and a first end surface of the booster back-iron abuts a first end surface of the core back-iron for electrical communication therewith, and such that booster teeth, which extend radially inward from the booster back-iron and are spaced apart from one another in the circumferential direction about the central axis to define a plurality of booster slots that align with the core slots, each have a first end surface abutting a first end surface of a corresponding core tooth for electrical communication therewith, wherein a first electrically insulating material encapsulates opposite sides of each booster tooth that define the booster slots and a second end surface of each booster tooth that is opposite the first end surface of that booster tooth.

19. The method according to claim 18, further comprising bending a plurality of stator wires over the booster teeth such that the stator wires contact the booster teeth during the bending.

20. The method according to claim 18, further comprising routing a plurality of stator wires axially through the core slots, wherein the stator booster is attached to the stator core after routing the plurality of stator wires axially through the core slots.

* * * * *